(12) United States Patent
Gross et al.

(10) Patent No.: US 9,738,788 B1
(45) Date of Patent: Aug. 22, 2017

(54) NANOPARTICLE-COATED MULTILAYER SHELL MICROSTRUCTURES

(71) Applicant: HRL Laboratories, LLC, Malibu, CA (US)

(72) Inventors: Adam F. Gross, Santa Monica, CA (US); Andrew P. Nowak, Los Angeles, CA (US); Tobias A. Schaedler, Oak Park, CA (US); John H. Martin, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 72 days.

(21) Appl. No.: 14/720,756

(22) Filed: May 23, 2015

Related U.S. Application Data (60) Provisional application No. 62/002,915, filed on May 26, 2014.

(51) Int. Cl.
*B32B 5/16* (2006.01)
*B22F 1/02* (2006.01)
(Continued)

(52) U.S. Cl.
CPC .............. *C09D 1/00* (2013.01); *B22F 1/0051* (2013.01); *B22F 1/02* (2013.01); *B22F 1/025* (2013.01);
(Continued)

(58) Field of Classification Search
CPC .......... B22F 1/0051; B22F 1/02; B22F 1/025; C23C 12/00; C23C 24/085; C23C 24/103;
(Continued)

(56) References Cited

U.S. PATENT DOCUMENTS 4,775,598 A * 10/1988 Jaeckel ................. B22F 1/0051
419/19
5,305,726 A 4/1994 Scharman et al.
(Continued)

FOREIGN PATENT DOCUMENTS

JP 2002305970 A 12/1990
JP 2009243352 A 9/2013
(Continued)

OTHER PUBLICATIONS

Caruso et al, Multilayerd titania, silica, andlaponite nanoparticle coatings on polystyrene colloidal templates and resulting inorganic hollow spheres, Chem. Mater. 2001, 13, 400-409).*
(Continued)

*Primary Examiner* — Holly Le
(74) *Attorney, Agent, or Firm* — O'Connor & Company (57) ABSTRACT

Novel nanoparticle-coated multilayer shell microstructures are disclosed herein. Some variations of the invention provide a material comprising a plurality of hollow microstructures characterized by an average shortest diameter from about 5 microns to about 1 millimeter, wherein each of the microstructures comprises multiple shells, including at least an inner shell and an outmost shell, with a combined thickness that is less than one-tenth of the average shortest diameter. The inner shell and the outmost shell have different composition. The outmost shell comprises nanoparticles sized between about 10 nanometers to about 500 nanometers, and the nanoparticles each contain an oxide and/or are surrounded by an oxide layer having a layer thickness of at least 1 nanometer. Several microstructure configurations are illustrated in the drawings.

28 Claims, 8 Drawing Sheets

(51) Int. Cl.
*C09D 1/00* (2006.01)
*C08K 3/08* (2006.01)
*C23C 30/00* (2006.01)
*B22F 1/00* (2006.01)
*C23C 24/10* (2006.01)
*C23C 24/08* (2006.01)
*C23C 12/00* (2006.01)

(52) U.S. Cl.
CPC ............... *C08K 3/08* (2013.01); *C23C 12/00* (2013.01); *C23C 24/085* (2013.01); *C23C 24/103* (2013.01); *C23C 30/00* (2013.01); *C01P 2004/34* (2013.01); *C01P 2004/60* (2013.01); *C01P 2004/61* (2013.01); *C08K 2003/0812* (2013.01); *C08K 2003/0862* (2013.01); *Y10T 428/2991* (2015.01)

(58) Field of Classification Search
CPC .. C23C 30/00; C01P 2004/34; C01P 2004/60; C01P 2004/61; Y10T 428/2991
USPC ........................................................ 428/403
See application file for complete search history.

(56) References Cited

U.S. PATENT DOCUMENTS

| 6,071,628 | A | 6/2000 | Seals et al. |
| 6,103,379 | A * | 8/2000 | Margel ............... B01J 13/14 427/212 |
| 2002/0136884 | A1 | 9/2002 | Oechsner |
| 2003/0077473 | A1 | 4/2003 | Bretschneider et al. |
| 2003/0104147 | A1 | 6/2003 | Bretschneider et al. |
| 2006/0065330 | A1 | 3/2006 | Cooper et al. |
| 2013/0146041 | A1 | 6/2013 | Hijii et al. |

FOREIGN PATENT DOCUMENTS

| JP | 2003113737 A | 9/2014 |
| WO | 2009020206 A1 | 2/2009 |
| WO | 2013038249 A2 | 3/2013 |
| WO | 2015042491 A1 | 3/2015 |

OTHER PUBLICATIONS

Qian et al., TiO2-Coated Multilayered SnO2 Hollow Microspheres for Dye-Sensitized Solar Cells, Adv. Mater. 2009, 21, 3663-3667.*
Huo et al, Synthesis of Hollow CdS-TiO2 Microspheres with Enhanced Visilble-Light Photocatalytic Activity, Hindawi Publishing Corporation, International Journal of Photoenergy, vol. 2012, Article ID 907290, DOI: 10.1155/2012/907290.*
Ashby, "The properties of foams and lattices," Phil. Trans. R. Soc. A 2006 364, (2006).
Clarke et al., "Materials Design for the next Generation Thermal Barrier Coatings" Annu. Rev. Mater. Res. 33 p. 383-417 (2003).
Erlebacher et al., "Evolution of nanoporosity in dealloying" Nature vol. 410 p. 450 (2001).
Göhler et al., "Metallic hollow sphere structures—status and outlook" CellMat 2010 Conference Proceedings.
Banhart, "Light-Metal Foams—History of Innovation and Technological Challenges" Advanced Engineering Materials 15, No. 3 p. 82. (2013).
Kosaka et al., "Concept of Temperature Swing Heat Insulation" in Combustion Chamber Walls and Appropriate Thermophysical Properties for Heat Insulation Coat SAE Int. J. Engines vol. 6, Issue 1 p. 142 (2013).
Solórzano et al., "Thermal Properties of Hollow Spheres," Multifunctional Metallic Hollow Sphere Struct., pp. 89-107 (2009).
Gross et al. "Hierarchical Carbon Foams with Independently Tunable Mesopore and Macropore Size Distributions," Langmuir 26(13), 11378-11383 (2010).
U.S. Appl. No. 14/491,974, filed Sep. 19,2014, and entitled "Thermal Barrier Materials and Coatings With Low Heat Capacity and Low Thermal Conductivity" (Schaedler et al.).

* cited by examiner

NANOPARTICLE-COATED MULTILAYER SHELL MICROSTRUCTURES

PRIORITY DATA

This patent application is a non-provisional application with priority to U.S. Provisional Patent App. No. 62/002,915, filed May 26, 2014, which is hereby incorporated by reference herein.

FIELD OF THE INVENTION

The present invention generally relates to microstructures coated with nanoparticles.

BACKGROUND OF THE INVENTION

Metal alloy coatings improve chemical and physical damage resistance as well as structural rigidity on microparticles and on solids made from microparticles. Metal alloy-coated microparticles are of interest for acoustic metamaterials, filler materials (for weight reduction), structural lightweight materials, corrosion-resistant coatings, energy-absorption materials, thermal insulation materials, and thermal barrier coatings.

Thermal barrier coatings are highly advanced material systems usually applied to metallic surfaces, such as gas turbines or aero-engine parts, operating at elevated temperatures, as a form of exhaust heat management. These coatings serve to insulate components from large and prolonged heat loads by utilizing thermally insulating materials which can sustain an appreciable temperature difference between the load-bearing alloys and the coating surface. In doing so, these coatings can allow for higher operating temperatures while limiting the thermal exposure of structural components, extending part life by reducing oxidation and thermal fatigue.

In certain commercial applications, materials are desired that possess low thermal conductivity and low heat capacity, while fulfilling requirements of high-temperature capability and structural integrity during repeated temperature cycling and operational stresses and mechanical loads. Materials with low thermal conductivity are of interest when thermal protection is necessary or when heat loss is undesired. Materials with low heat capacity are of interest for applications in which temperature swings are encountered and when the insulation material should not significantly affect the temperature swing.

In the internal combustion engine, materials that insulate the hot combustion gas from the cold, water-cooled engine block are desired to avoid energy loss by transferring heat from the combustion gas to the cooling water. At the same time, during the intake cycle, the insulation material should cool down rapidly in order to not heat up the fuel-air mixture before ignition to avoid knocking. See Kosaka et al., "Concept of Temperature Swing Heat Insulation in Combustion Chamber Walls and Appropriate Thermophysical Properties for Heat Insulation Coat," *SAE Int. J. Engines* Vol. 6, Issue 1 p. 142 (2013). For such an application, low thermal conductivity and low heat capacity is required. Furthermore, low thermal conductivity is only required at high temperatures; at low temperatures, a higher thermal conductivity is beneficial.

The existing practice utilizes ceramic thermal barrier coatings (TBCs), typically 7 wt % yttria-stabilized zirconia. TBCs based on zirconia have very low thermal conductivity (0.8-1.6 W/m·K at room temperature), but relatively high heat capacity (2000-2300 kJ/m$^3$·K at room temperature). The 10-20% porosity created by the deposition method is either random between different "splats" for plasma-sprayed coatings or "feather-like" for electron beam vapor-deposited coating, as explained in Clarke and Levi, "Materials Design for the next Generation Thermal Barrier Coatings" *Annu. Rev. Mater. Res.* 33 pp. 383-417 (2003). Both types of cellular architecture are not favorable to structural integrity, and the brittle ceramic material causes low damage tolerance. Another disadvantage is that both cellular architectures are fairly open and gases from the outside can access many of the pores and even the underlying substrate. Under certain circumstances the open porosity in such TBCs is filled with solid deposits from the combustion process, thereby increasing the thermal conductivity.

Other prior art for thermal barrier materials includes thermal protection systems for space applications, such as tile for the Space Shuttle. Shuttle tiles exhibit low thermal conductivity and low heat capacity, but these materials are designed for extreme temperatures (greater than 1200° C.) and have poor mechanical properties such as low crush strength. These tiles are open cellular structures and absorb significant amount of water because of open porosity, which increases mass and can result in damage when the water is vaporized during exposure to high temperatures.

In view of the prior art, what is needed is a thermal barrier material that possesses low heat capacity and low thermal conductivity, while at the same time, high structural integrity and robustness. Such thermal barrier materials preferably are suitable for both coatings and for bulk (freestanding) materials and parts. Such thermal barrier materials should have closed porosity rather than open porosity, resulting in improved durability and structural rigidity. A continuous coating with closed porosity reduces thermal conductivity and protects the surface from hot gases.

Beyond thermal barrier materials, improved materials are desired for thermal insulation materials, structural lightweight materials, corrosion-resistant coatings, energy-absorption materials, and acoustic metamaterials.

SUMMARY OF THE INVENTION

The present invention addresses the aforementioned needs in the art, as will now be summarized and then further described in detail below.

Some variations provide a material comprising a plurality of hollow microstructures characterized by an average shortest diameter from about 5 microns to about 1 millimeter, wherein each of the microstructures comprises multiple shells, including at least an inner shell and an outmost shell, with a combined thickness that is less than one-tenth of the average shortest diameter;

wherein the inner shell and the outmost shell have different composition;

wherein the outmost shell comprises nanoparticles sized between about 10 nanometers to about 500 nanometers; and wherein the nanoparticles each contain an oxide and/or the nanoparticles are each surrounded by an oxide layer having a layer thickness of at least 1 nanometer.

In some embodiments, the multiple shells include at least one intermediate shell disposed between the inner shell and the outmost shell. In certain embodiments, the multiple shells include at least two intermediate shells disposed between the inner shell and the outmost shell. The multiple shells typically include 10 or less total shells.

The hollow microstructures may be of any shape. In various embodiments, the hollow microstructures are spherical or sphere-like, spheroidal, ellipsoidal, or rod or rod-like microstructures. The hollow microstructures may contain empty space or may contain air or another gas, such as argon, nitrogen, helium, carbon dioxide, etc.

The inner shell may contain a component selected from the group consisting of a polymer, a copolymer, a ceramic, a glass, a metal, carbon, a carbonized organic material, a thermally treated organic material, and combinations thereof. In some embodiments, the inner shell comprises $SiO_2$, $Al_2O_3$, $AlPO_4$, or a combination thereof. In these or other embodiments, the inner shell comprises polyethylene, poly(methyl methacrylate), polystyrene, polyvinylidene chloride, poly(acrylonitrile-co-vinylidene chloride-co-methyl methacrylate), or a combination thereof.

In some embodiments, the outmost shell comprises the nanoparticles dispersed in a matrix. The outmost shell may contain the nanoparticles, or layers thereof, separated by the oxide or by an organic material.

The outmost shell may contain the nanoparticles in an unfused form, such as when present in a precursor material. The outmost shell contains the nanoparticles fused together to form a solid, in some embodiments of the invention.

The nanoparticles may contain an alloy comprising Ni, Co, Fe, Nb, Mo, W, Ta, Cr, or combinations thereof, wherein the nanoparticles are surrounded by the oxide layer. In some embodiments, the alloy comprises between about 1 wt % to about 15 wt % Al and further comprises between about 1 wt % to about 25 wt % Cr.

In certain materials, the nanoparticles are a mixture of Al, Cr, and Ni nanoparticles fused together to a NiCrAl alloy containing between about 5 wt % to about 15 wt % Al, between about 15 wt % to about 30 wt % Cr, and between about 55 wt % to about 80 wt % Ni. In certain materials, the nanoparticles are a mixture of Al, Cr, and Ni nanoparticle layers fused together to a NiCrAl alloy containing between about 5 wt % to about 15 wt % Al, between about 15 wt % to about 30 wt % Cr, and between about 55 wt % to about 80 wt % Ni.

The hollow microstructures may be present in an unfused or unbonded precursor state. In an intermediate or final product, the hollow microstructures may be fused together, such as by sintering or heat treatment, or any other technique.

In some embodiments, the hollow microstructures are bonded together with an adhesive or reactive phase. For example, an adhesive or reactive phase may be about 10 vol % or less of the material.

In some embodiments, the hollow microstructures are dispersed in a matrix material. For example, a matrix material may be selected from the group consisting of ceramics, glasses, metals, metallic compounds, and combinations thereof.

The material may be a thermal insulation coating or thermal barrier coating disposed on a metallic or ceramic substrate. In some embodiments, the material is dispersed in a matrix material selected from the group consisting of ceramics, glasses, metals, metallic compounds, and combinations thereof, and the material is a thermal insulation material or thermal barrier material disposed on a metallic or ceramic substrate.

Variations of the invention provide a hollow microstructure characterized by a shortest diameter from about 5 microns to about 1 millimeter, wherein the microstructure comprises multiple shells, including at least an inner shell and an outmost shell, with a combined thickness that is less than one-tenth of the shortest diameter;

wherein the inner shell and the outmost shell have different composition;

wherein the outmost shell comprises nanoparticles sized between about 10 nanometers to about 500 nanometers; and wherein the nanoparticles each contain an oxide and/or the nanoparticles are each surrounded by an oxide layer having a layer thickness of at least 1 nanometer.

In some embodiments, the multiple shells further include at least one or at least two intermediate shell(s) disposed between the inner shell and the outmost shell. In some embodiments, the multiple shells include 10 or less total shells.

The hollow microstructures may be of any shape. In various embodiments, the hollow microstructures are spherical or sphere-like, spheroidal, ellipsoidal, or rod or rod-like microstructures. The hollow microstructures may contain empty space or may contain air or another gas, such as argon, nitrogen, helium, carbon dioxide, etc.

The inner shell may contain a component selected from the group consisting of a polymer, a copolymer, a ceramic, a glass, a metal, carbon, a carbonized organic material, a thermally treated organic material, and combinations thereof. In some embodiments, the inner shell comprises $SiO_2$, $Al_2O_3$, $AlPO_4$, or a combination thereof. In these or other embodiments, the inner shell comprises polyethylene, poly(methyl methacrylate), polystyrene, polyvinylidene chloride, poly(acrylonitrile-co-vinylidene chloride-co-methyl methacrylate), or a combination thereof.

The outmost shell may contain the nanoparticles dispersed in a matrix. Alternatively, or additionally, the outmost shell may contain the nanoparticles, or layers thereof, separated by the oxide or by an organic material.

The outmost shell may contain the nanoparticles in a fused or unfused form. In some embodiments, the outmost shell contains the nanoparticles fused together to form a solid.

The nanoparticles may contain an alloy comprising Ni, Co, Fe, Nb, Mo, W, Ta, Cr, or combinations thereof, and wherein the nanoparticles are surrounded by the oxide layer. For example, the alloy may contain between about 1 wt % to about 15 wt % Al and between about 1 wt % to about 25 wt % Cr.

In certain microstructure embodiments, the nanoparticles are a mixture of Al, Cr, and Ni nanoparticles fused together to a NiCrAl alloy containing between about 5 wt % to about 15 wt % Al, between about 15 wt % to about 30 wt % Cr, and between about 55 wt % to about 80 wt % Ni. In certain microstructure embodiments, the nanoparticles are a mixture of Al, Cr, and Ni nanoparticle layers fused together to a NiCrAl alloy containing between about 5 wt % to about 15 wt % Al, between about 15 wt % to about 30 wt % Cr, and between about 55 wt % to about 80 wt % Ni.

DETAILED DESCRIPTION OF EMBODIMENTS OF THE INVENTION

The structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The invention in some variations provides a microstructure comprising multiple thin shells that form a hollow microsphere with a diameter of about 1 mm or less. The outmost shell may contain nanoparticles with sizes between about 10 nm and 500 nm, wherein each nanoparticle either is made from an oxide or is surrounded by a thin oxide layer (or both containing an oxide and surrounded by a thin oxide layer).

Hollow microspheres are structures that encompass a small closed volume. Typically a thin shell contains a small amount of gas (e.g., air, an inert gas, or a synthetic mixture of gases) that may be at a pressure below one atmosphere. Since air and other gases are excellent thermal insulators and have very low heat capacity compared to any solid material, hollow microspheres can provide low thermal conductivity and low heat capacity. The hollow microspheres may also contain empty space, i.e. vacuum or near vacuum.

In addition to materials with low thermal conductivity and low volumetric heat capacity, the disclosed nanoshell structures are of interest for acoustic metamaterials, with periodic arrays; filler materials, to add to a matrix for reduced weight; structural lightweight materials, sintered together or dispersed in a matrix to form a lightweight material with high specific strength and stiffness; energy-absorption materials, in which the nanoshells can crush under a specific load and absorb mechanical energy; and lightweight corrosion-resistant coatings, among other structures and systems.

Some variations provide a hollow microsphere with multiple layers and one outer layer containing or consisting of nanoparticles. The outer shell is preferably continuous (e.g., fused together, as defined below) rather than being formed from discrete nanoparticles, thereby improving durability and structural rigidity.

Some embodiments of the invention will now be further described according to the accompanying drawings, which are intended to be representative only and not to limit the scope of the invention.

Figure 1:
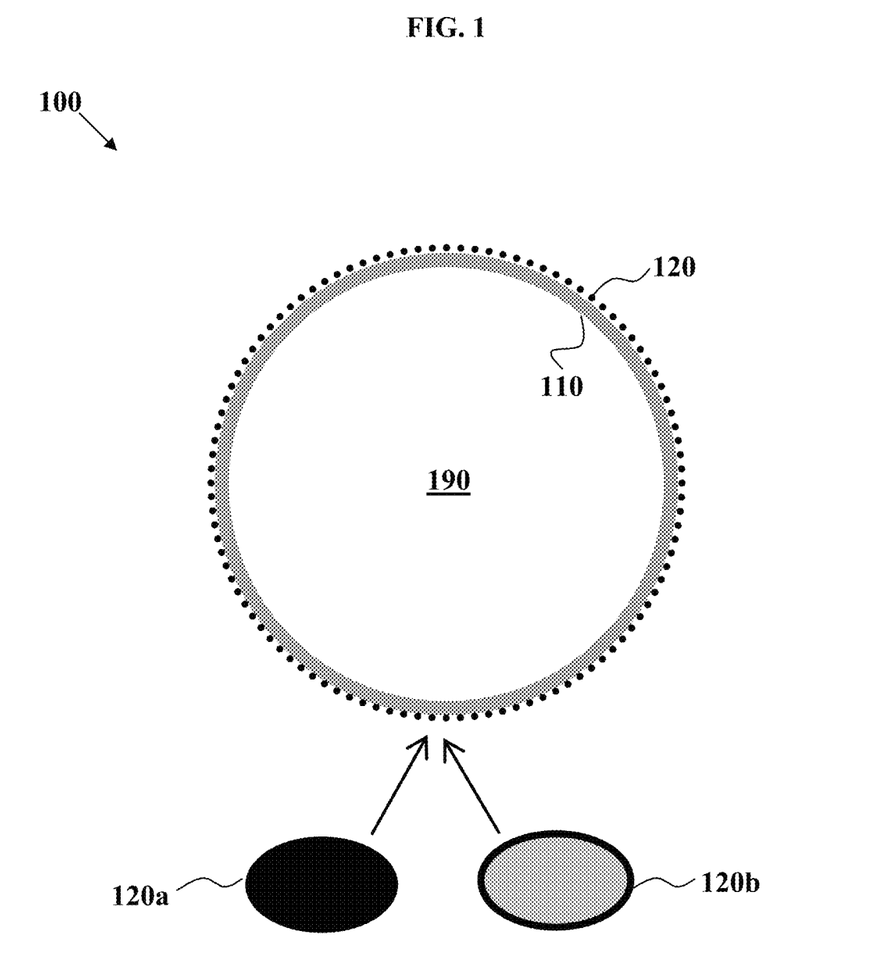
FIG. 1 is an illustration of an exemplary multilayer nanoshell with a continuous inner shell (grey) and an outer shell containing nanoparticles (black dots), which may be solid oxide particles or particles with a thin oxide shell.

FIG. 1 is an illustration of an exemplary multilayer nanoshell 100 with a continuous inner shell 110 surrounding empty space (or a gas) 190 and an outer shell containing nanoparticles 120, which may be solid oxide particles 120a or particles with a thin oxide shell 120b.

Figure 2:
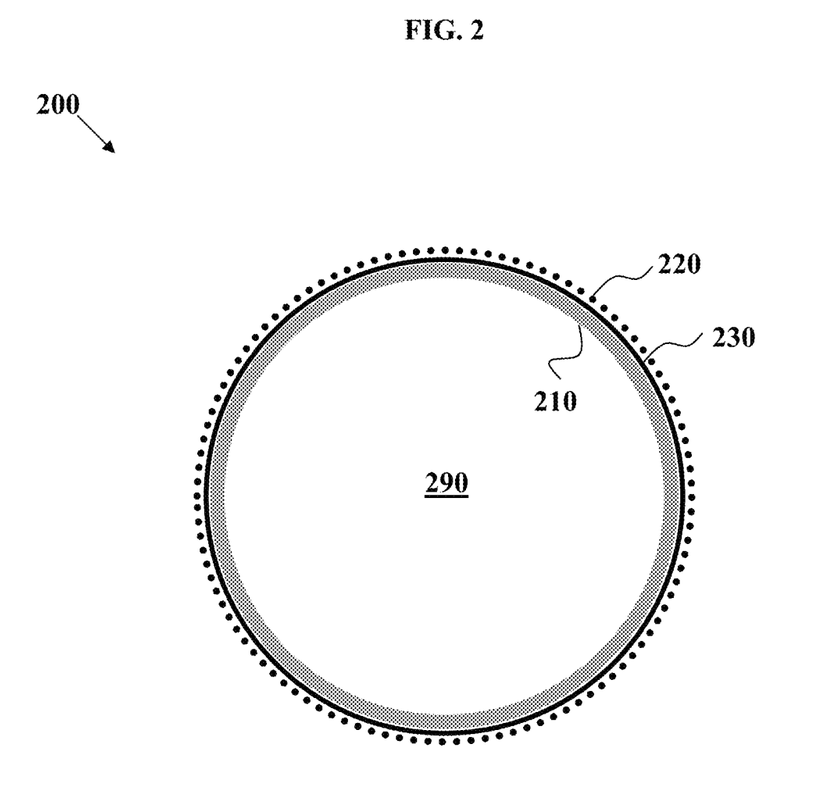
FIG. 2 is an illustration of an exemplary nanoshell structure with two continuous inner layers (grey and black solid lines), and an outer shell containing nanoparticles (black dots).

FIG. 2 is an illustration of an exemplary nanoshell structure 200 with two continuous inner layers 210 and 230, and an outer shell containing nanoparticles 220. The inner layer 210 surrounds empty space (or a gas) 290. In other embodiments, additional continuous inner layers may be present (not shown).

Figure 3:
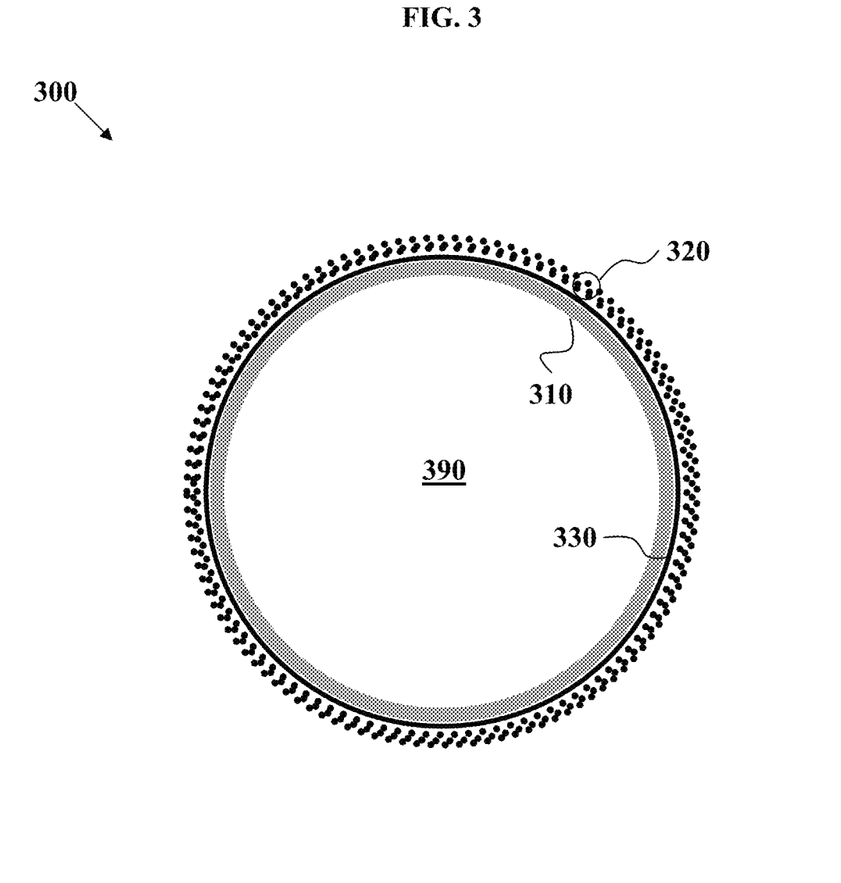
FIG. 3 is an illustration of an exemplary nanoshell structure with an outer layer containing multiple layers of nanoparticles stacked on top of each other, along with two continuous inner layers (grey and black solid lines).

FIG. 3 is an illustration of an exemplary nanoshell structure 300 with an outer layer containing multiple layers 320 of nanoparticles stacked on top of each other, along with two continuous inner layers 310 and 330. The inner layer 310 surrounds empty space (or a gas) 390.

Figure 4:
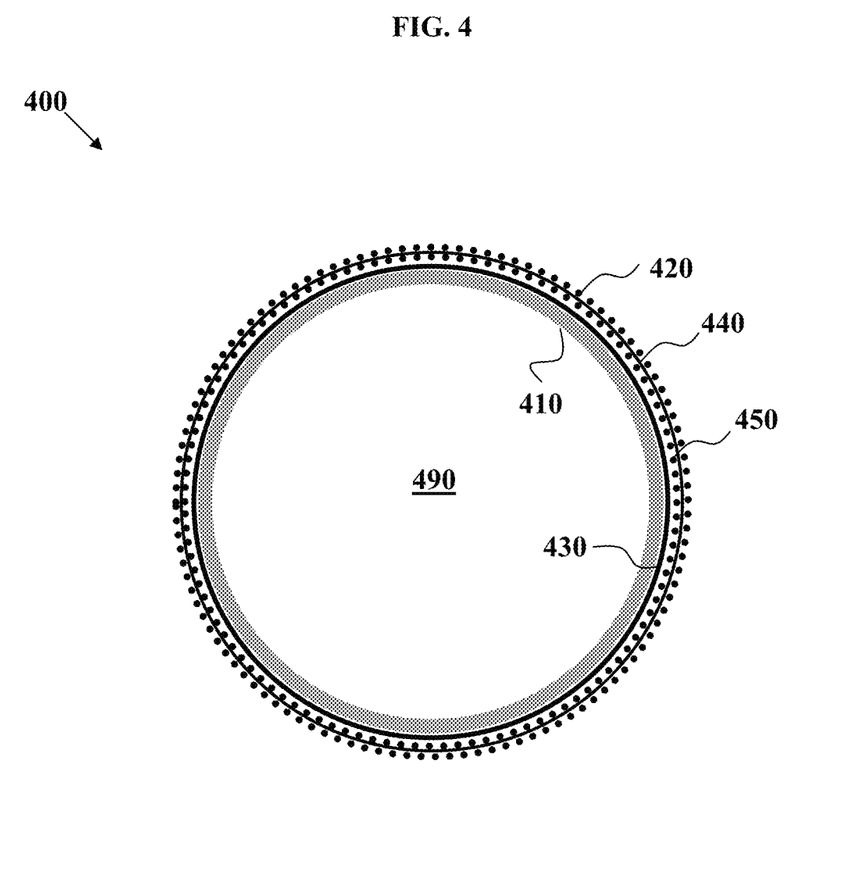
FIG. 4 is an illustration of an exemplary nanoshell structure with two layers of nanoparticles (black dots) separated by an organic or oxide material (thin, solid black line) along with two continuous inner layers (grey and thick black solid lines).

FIG. 4 is an illustration of an exemplary nanoshell structure 400 with two layers of nanoparticles 420, 450 separated by an organic or oxide material 440 along with two continuous inner layers 410 and 430. The inner layer 410 surrounds empty space (or a gas) 490.

Some embodiments provide a structure exhibiting the shape of a hollow sphere with a diameter less than 1 mm but more than 5 microns, comprising at least two shells (typically no more than 10 shells) with a combined thickness less than one-tenth of the sphere diameter. The combined thickness of the shells, divided by the sphere diameter, may be about between about 0.1 to about 0.0001, in some embodiments.

Some embodiments provide a structure exhibiting a hollow oval, rod-like, or sphere-like shape with the shortest diameter being less than 1 mm but more than 5 microns, comprising at least two shells (typically no more than 10 shells) with a combined thickness less than one-tenth of the shortest diameter. The "shortest diameter" is the minimum diameter of an arbitrary three-dimensional structure that is geometrically defined by at least two diameters. If only a single effective diameter can be defined, then the shortest diameter is the effective diameter. The combined thickness of the shells, divided by the shortest diameter, may be about between about 0.1 to about 0.0001, in some embodiments.

In some embodiments, an outmost shell consists of nanoparticles with sizes between 10 nm and 500 nm, for example, wherein each nanoparticle either contains (is fabricated from) an oxide or is surrounded by an oxide layer with a thickness of at least 1 nm. The nanoparticles are typically made from a different material than the shell material.

An inner shell (which may be the innermost shell or an intermediate shell) may include a polymer, ceramic, or metal, for example. In some embodiments, the inner shell contains a glass, $SiO_2$, $Al_2O_3$, $AlPO_4$, or a combination thereof. In some embodiments, the inner shell contains polyethylene, poly(methyl methacrylate), polystyrene, polyvinylidene chloride, poly(acrylonitrile-co-vinylidene chloride-co-methyl methacrylate), or a combination thereof. The inner shell may include carbon, a thermally treated organic material, or a carbonized organic.

Possible microparticles also include hollow glass spheres, hollow aluminum phosphate spheres, hollow alumina spheres, hollow zirconia spheres, other ceramic hollow spheres, hollow polyethylene spheres, hollow polystyrene spheres, hollow polyacrylate spheres, hollow polymethacrylate spheres, or hollow thermoplastic microspheres containing polymers such as vinylidene chloride, acrylo-nitrile or methyl methacrylate. While spherical shapes may be preferred, other geometries in the aforementioned materials may also be utilized.

The nanoparticles in the outer shell may be made from a metal or metal alloy surrounded by an oxide layer. In some embodiments, the nanoparticles of the outer shell comprise an alloy with more than 50 wt % Ni, Co, Fe, Nb, Mo, W or Ta, or combinations thereof, surrounded by an oxide layer. In certain embodiments, the nanoparticles of the outer shell comprise nickel, cobalt, or iron alloy containing between about 1 and 15 wt % Al, and between about 1 and 25 wt % Cr, surrounded by an oxide layer.

Possible nanoparticles include nickel superalloys (e.g., Hastelloy, Inconel, or NiCrAlY), cobalt alloys (e.g., CoCrAlY), aluminum alloys (e.g., Al 6061), titanium alloys (e.g., $TiAl_6V_4$), refractory alloys (e.g., Nb, W alloys), or steels/iron-based alloys (e.g., Stainless Steel 316).

In some embodiments, the nanoparticles have an average shortest diameter of about 50-400 nm, preferably about 100-200 nm. Such nanoparticles may be made by wire explosion, electrical-discharge machining, cryomilling, or other techniques known in the art.

The outmost shell may include nanoparticles dispersed in a matrix. The outmost shell may include layers of nanoparticles separated by an organic or oxide material. The outmost shell may also include nanoparticles fused together (defined below) to form a solid layer on the surface.

Some variations provide a material formed by fusing together a multitude of microstructures by sintering, heat treatment, or another bonding method. In some embodiments, a material is formed by bonding together a multitude of microstructures with an adhesive, which is typically a small amount (such as less than 10% volume fraction) of a low-melting-phase, glass, reactive phase, or other suitable material.

In some embodiments, a material includes a multitude of microstructures dispersed in a matrix, wherein the matrix material is selected from the group consisting of ceramics, glasses, metals, and metallic compounds.

Some variations provide a material comprising a plurality of hollow microstructures characterized by an average shortest diameter from about 5 microns to about 1 millimeter, wherein each of the microstructures comprises multiple shells, including at least an inner shell and an outmost shell, with a combined thickness that is less than one-tenth of the average shortest diameter (of the microstructures);

wherein the inner shell and the outmost shell have different composition;

wherein the outmost shell comprises nanoparticles sized between about 10 nanometers to about 500 nanometers; and wherein the nanoparticles each contain an oxide and/or the nanoparticles are each surrounded by an oxide layer having a layer thickness of at least 1 nanometer.

In some embodiments, the multiple shells include at least one intermediate shell disposed between the inner shell and the outmost shell. In certain embodiments, the multiple shells include at least two intermediate shells disposed between the inner shell and the outmost shell. The multiple shells typically include 10 or less total shells.

The hollow microstructures may be of any shape. In various embodiments, the hollow microstructures are spherical or sphere-like, spheroidal, ellipsoidal, or rod or rod-like microstructures. The hollow microstructures may contain empty space or may contain air or another gas, such as argon, nitrogen, helium, carbon dioxide, etc.

The inner shell may contain a component selected from the group consisting of a polymer, a copolymer, a ceramic, a glass, a metal, carbon, a carbonized organic material, a thermally treated organic material, and combinations thereof. In some embodiments, the inner shell comprises $SiO_2$, $Al_2O_3$, $AlPO_4$, or a combination thereof. In these or other embodiments, the inner shell comprises polyethylene, poly(methyl methacrylate), polystyrene, polyvinylidene chloride, poly(acrylonitrile-co-vinylidene chloride-co-methyl methacrylate), or a combination thereof.

In some embodiments, the outmost shell comprises the nanoparticles dispersed in a matrix. The outmost shell may contain the nanoparticles, or layers thereof, separated by the oxide or by an organic material.

The outmost shell may contain the nanoparticles in an unfused form, such as when present in a precursor material. For example, a precursor material may include a plurality of hollow microstructures, wherein each of the microstructures comprises multiple shells, including at least an inner shell and an outmost shell, with a combined thickness that is less than one-tenth of the average shortest diameter; wherein the outmost shell comprises unfused nanoparticles sized between about 10 nanometers to about 500 nanometers.

In certain embodiments, a precursor material or formulation includes (i) a plurality of hollow microstructures and (ii) unfused nanoparticles sized between about 10 nanometers to about 500 nanometers, wherein the hollow microstructures and the unfused nanoparticles may be provided in combination or in separate containers with instructions to combine and fuse them together.

In some embodiments of the invention, the outmost shell contains the nanoparticles fused together to form a solid. As intended in this specification, "fused" should be interpreted broadly to mean any manner in which nanoparticles are bonded, joined, coalesced, or otherwise combined, at least in part, together. Many known techniques may be employed for fusing together nanoparticles.

In various embodiments, fusing is accomplished by sintering, heat treatment, pressure treatment, combined heat/pressure treatment, electrical treatment, electromagnetic treatment, melting/solidifying, contact (cold) welding, solution combustion synthesis, self-propagating high-temperature synthesis, solid state metathesis, or a combination thereof.

In certain embodiments, fusing is accomplished by sintering of nanoparticles. "Sintering" should be broadly construed to mean a method of forming a solid mass of material by heat and/or pressure without melting the entire mass to the point of liquefaction. The atoms in the materials diffuse across the boundaries of the particles, fusing the particles together and creating one solid piece. The sintering temperature is typically less than the melting point of the material. In some embodiments, liquid-state sintering is used, in which at least one but not all elements are in a liquid state.

When sintering or other heat treatment is utilized, the heat or energy may be provided by electrical current, electromagnetic energy, chemical reactions (including formation of ionic or covalent bonds), electrochemical reactions, pressure, or combinations thereof. Heat may be provided for initiating chemical reactions (e.g., to overcome activation energy), for enhancing reaction kinetics, for shifting reaction equilibrium states, or for adjusting reaction network distribution states.

In some embodiments, a sintering technique may be selected from the group consisting of radiant heating, induction, spark plasma sintering, microwave heating, capacitor discharge sintering, and combinations thereof.

Figure 5:
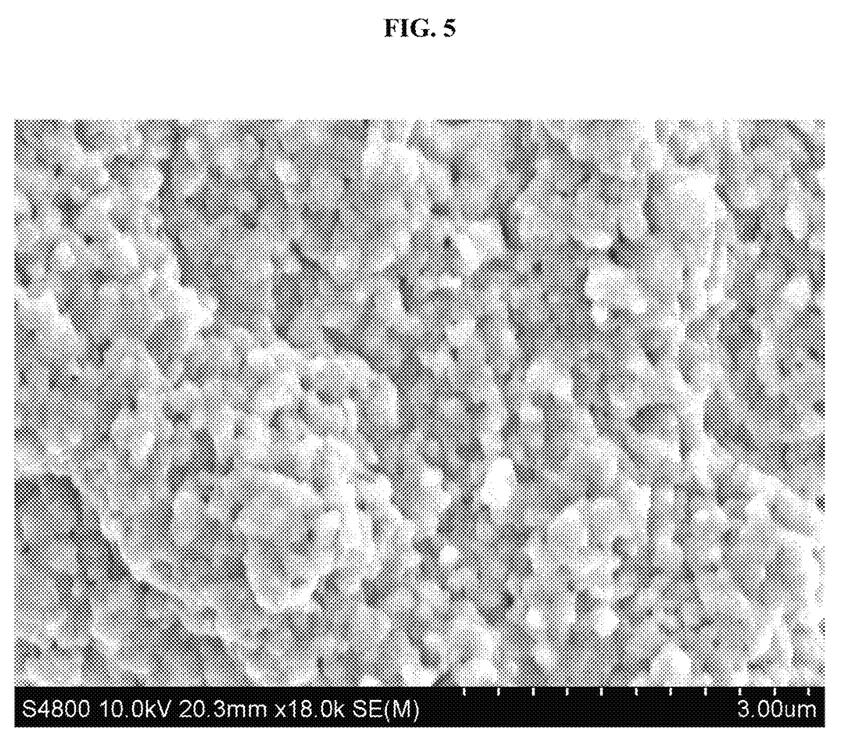
FIG. 5 is an exemplary SEM image of a continuous network of sintered nickel nanoparticles on a substrate.

FIG. 5 is an exemplary SEM image of a continuous network of sintered nickel nanoparticles (each surrounded by a nickel oxide layer) on a substrate such as glass microspheres. The nickel nanoparticles are not discrete, but instead have formed a continuous network of connected particles that are fused together.

It is noted that structures provided by the present disclosure differ from structures provided by layer-by-layer assembly. In some embodiments of the invention, there are no polymers (or other organic species) present between layers or regions of nanoparticles. In layer-by-layer assembly, there will be layers of polymers coated by layers of nanoparticles, in a repeating pattern to form a multilayer structure. In such a multilayer structure, there is one nanoparticle layer electrostatically bound to the each polymer layer. In contrast, the present disclosure provides thicker layers of nanoparticles on the polymer surface (or other surface of microparticle or inner shell). In preferred embodiments, the thickness of nanoparticles is greater than the thickness of a single layer of electrostatically bound nanoparticles.

The nanoparticles may contain an alloy comprising Ni, Co, Fe, Nb, Mo, W, Ta, Cr, or combinations thereof, wherein the nanoparticles are surrounded by the oxide layer. In certain embodiments, the alloy comprises between about 1 wt % to about 15 wt % Al and further comprises between about 1 wt % to about 25 wt % Cr.

In certain materials, the nanoparticles are a mixture of Al, Cr, and Ni nanoparticles fused together to a NiCrAl alloy containing between about 5 wt % to about 15 wt % Al, between about 15 wt % to about 30 wt % Cr, and between about 55 wt % to about 80 wt % Ni. In certain materials, the nanoparticles are a mixture of Al, Cr, and Ni nanoparticle layers fused together to a NiCrAl alloy containing between about 5 wt % to about 15 wt % Al, between about 15 wt % to about 30 wt % Cr, and between about 55 wt % to about 80 wt % Ni.

The hollow microstructures may be provided or present in an unfused or unbonded precursor state. The hollow microstructures may be in an unfused state even if the nanoparticles are fused together. That is, on any particular hollow microstructure, there may be an outmost layer or shell comprising nanoparticles that are fused together. All of the hollow microstructures may contain an outmost shell comprising nanoparticles that are fused together. Any portion (including none or all) of such hollow microstructures may be fused or unfused.

For example, some embodiments provide a precursor material comprising a plurality of unfused hollow microstructures characterized by an average shortest diameter from about 5 microns to about 1 millimeter, wherein each of the microstructures comprises multiple shells, including at least an inner shell and an outmost shell, with a combined thickness that is less than one-tenth of the average shortest diameter;

wherein the inner shell and the outmost shell have different composition; and wherein the outmost shell comprises (fused or unfused) nanoparticles sized between about 10 nanometers to about 500 nanometers.

In an intermediate or final product, the hollow microstructures may be fused together, such as by sintering or heat treatment, or any other technique. For example, the hollow microstructures may be fused together by sintering, heat treatment, pressure treatment, combined heat/pressure treatment, melting/solidifying, contact (cold) welding, solution combustion synthesis, self-propagating high-temperature synthesis, solid state metathesis, or a combination thereof.

Figure 6:
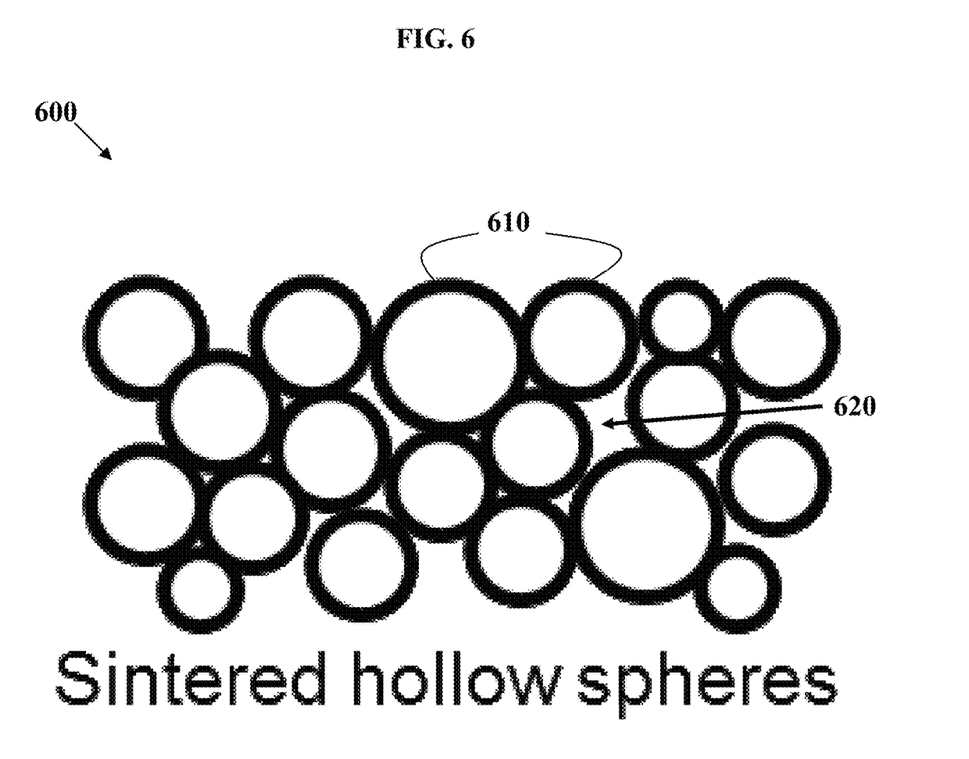
FIG. 6 is a schematic of a material comprising sintered hollow microstructures, in some embodiments.

FIG. 6 is a schematic of a material comprising sintered hollow microstructures, in some embodiments. FIG. 6 shows an exemplary schematic of a microstructure 600 with sintered hollow spheres 610 and space 620 between spheres (outside of the sintered hollow spheres 610).

Figure 7:
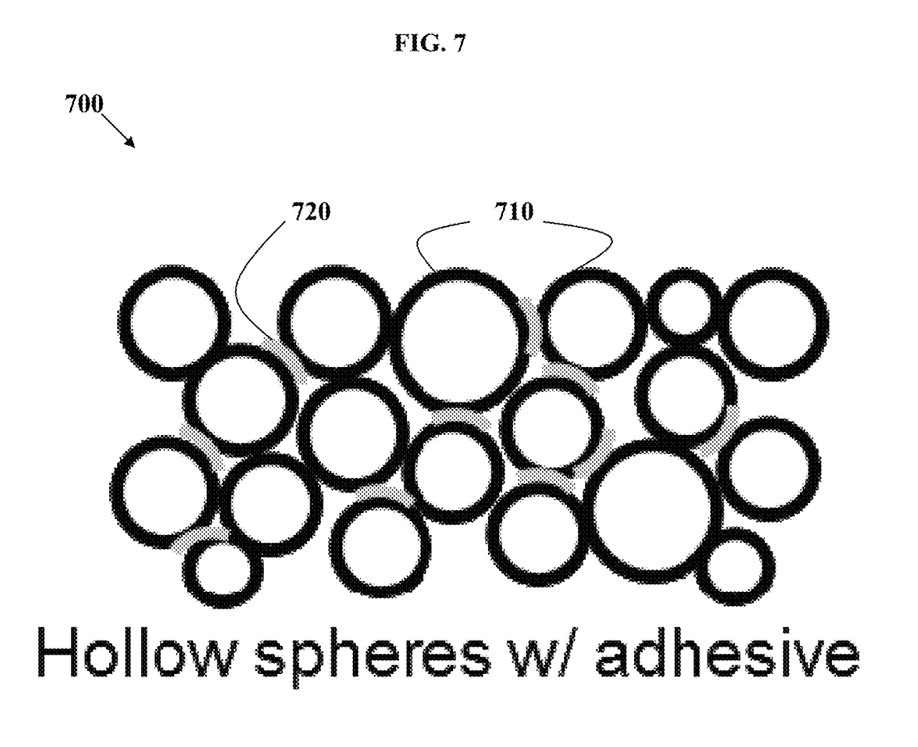
FIG. 7 is a schematic of a material comprising hollow microstructures bonded with an adhesive, in some embodiments.

In some embodiments, the hollow microstructures are bonded together with an adhesive or reactive phase. For example, an adhesive or reactive phase may be about 10 vol % or less of the material. FIG. 7 is a schematic of a material comprising hollow microstructures bonded with an adhesive, in some embodiments. In FIG. 7, a microstructure 700 includes hollow spheres 710 with an adhesive 720.

Figure 8:
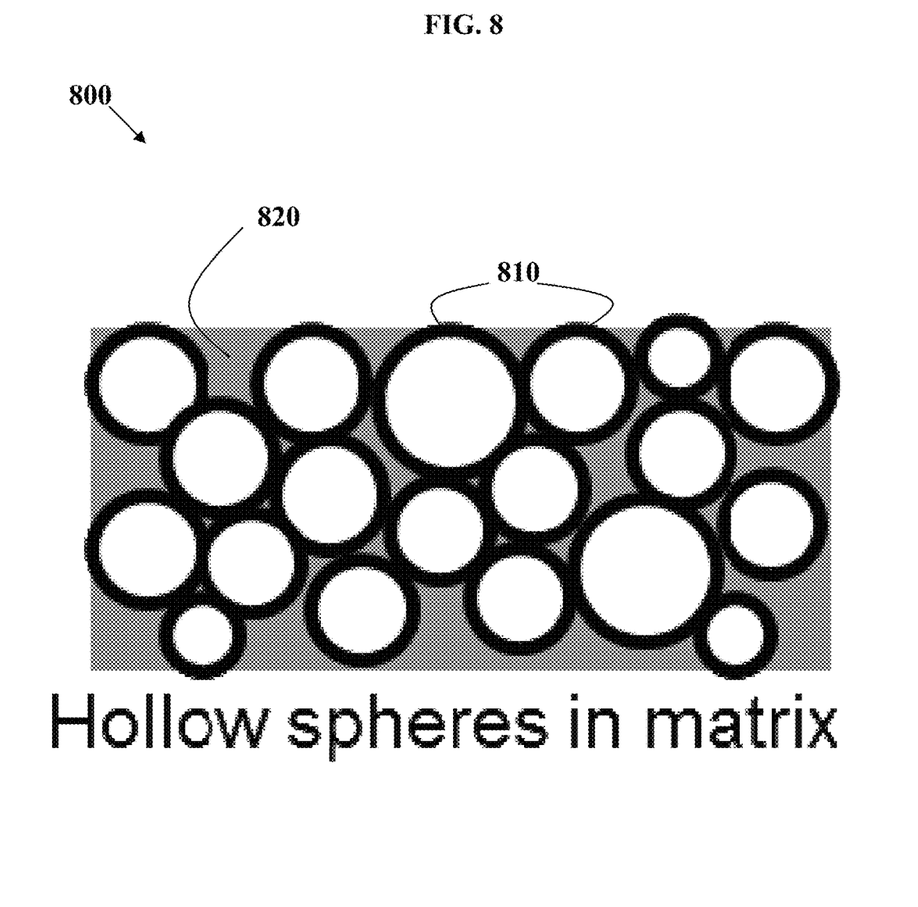
FIG. 8 is a schematic of a material comprising hollow microstructures dispersed in a matrix material, in some embodiments.

In some embodiments, the hollow microstructures are dispersed in a matrix material. For example, a matrix material may be selected from the group consisting of ceramics, glasses, metals, metallic compounds, and combinations thereof. FIG. 8 is a schematic of a material comprising hollow microstructures dispersed in a matrix material, in some embodiments. In FIG. 8, a microstructure 800 includes hollow spheres 810 in a matrix 820.

The material may be a thermal insulation coating or thermal barrier coating disposed on a metallic or ceramic substrate. In some embodiments, the material is dispersed in a matrix material selected from the group consisting of ceramics, glasses, metals, metallic compounds, and combinations thereof, and the material is a thermal insulation material or thermal barrier material disposed on a metallic or ceramic substrate.

Variations of the invention provide a hollow microstructure characterized by a shortest diameter from about 5 microns to about 1 millimeter, wherein the microstructure comprises multiple shells, including at least an inner shell and an outmost shell, with a combined thickness that is less than one-tenth of the shortest diameter; wherein the inner shell and the outmost shell have different composition; wherein the outmost shell comprises nanoparticles sized between about 10 nanometers to about 500 nanometers; and wherein the nanoparticles each contain an oxide and/or the nanoparticles are each surrounded by an oxide layer having a layer thickness of at least 1 nanometer.

In some embodiments, the multiple shells further include at least one or at least two intermediate shell(s) disposed between the inner shell and the outmost shell. In some embodiments, the multiple shells include 10 or less total shells.

The hollow microstructures may be of any shape. In various embodiments, the hollow microstructures are spherical or sphere-like, spheroidal, ellipsoidal, or rod or rod-like microstructures. The hollow microstructures may contain empty space or may contain air or another gas, such as argon, nitrogen, helium, carbon dioxide, etc.

The inner shell may contain a component selected from the group consisting of a polymer, a copolymer, a ceramic, a glass, a metal, carbon, a carbonized organic material, a thermally treated organic material, and combinations thereof. In some embodiments, the inner shell comprises $SiO_2$, $Al_2O_3$, $AlPO_4$, or a combination thereof. In these or other embodiments, the inner shell comprises polyethylene, poly(methyl methacrylate), polystyrene, polyvinylidene chloride, poly(acrylonitrile-co-vinylidene chloride-co-methyl methacrylate), or a combination thereof.

The outmost shell may contain the nanoparticles dispersed in a matrix. Alternatively, or additionally, the outmost shell may contain the nanoparticles, or layers thereof, separated by the oxide or by an organic material.

The outmost shell may contain the nanoparticles in a fused or unfused form. In some embodiments, the outmost shell contains the nanoparticles fused together to form a solid.

The nanoparticles may contain an alloy comprising Ni, Co, Fe, Nb, Mo, W, Ta, Cr, or combinations thereof, and wherein the nanoparticles are surrounded by the oxide layer. For example, the alloy may contain between about 1 wt % to about 15 wt % Al and between about 1 wt % to about 25 wt % Cr.

In certain microstructure embodiments, the nanoparticles are a mixture of Al, Cr, and Ni nanoparticles fused together to a NiCrAl alloy containing between about 5 wt % to about 15 wt % Al, between about 15 wt % to about 30 wt % Cr, and between about 55 wt % to about 80 wt % Ni. In certain microstructure embodiments, the nanoparticles are a mixture of Al, Cr, and Ni nanoparticle layers fused together to a NiCrAl alloy containing between about 5 wt % to about 15 wt % Al, between about 15 wt % to about 30 wt % Cr, and between about 55 wt % to about 80 wt % Ni Methods to produce the microstructures are not limited. Some embodiments employ electroplating, which requires an electrical connection to discrete particles. Some embodiments employ electroless plating, which requires a catalyst to be applied to surfaces and then metal ions to be reduced onto a surface. This works well for single elements with small reduction potentials (e.g. Cu or Ni). Vacuum deposition may be used to deposit metals or multi-element alloys in a line-of-sight direction. Metal alloys may be applied by a slurry approach, relying on viscous adhesion, optionally with organic binders and additives to enhance adhesion. Metal alloys may be applied onto spheres or other geometries using a fluid-bed reactor.

In some embodiments, metal alloy nanoparticles are transported to the surfaces of microparticles and then fused (e.g., sintered) into continuous shells. Fusion aids (e.g., sintering aids) may be introduced, such as between layers of nanoparticles, to improve the density of the final material.

In certain embodiments, nanoparticles are applied as layers that fuse together to form an alloy upon heat treatment. For example, a layer of Ni, a layer of Cr, and a layer of Al nanoparticles may be provided and then converted to NiCrAl alloy by a heat treatment.

In some preferred embodiments, relatively thick coatings/layers of nanoparticles do not contain polymer layers between nanoparticle layers—in contrast to structures provided by layer-by-layer deposition. The absence of internal polymer layers allows sintering the multi-layer nanoparticles into thick, substantially void-free nanoparticle layers on the microparticles. "Substantially void-free" means that there are essentially no voids larger than 1 micron within the nanoparticle layers (see, for example, FIG. 5). In various embodiments, the absence of polymer layers between nanoparticle layers allows sintering into nanoparticle layers that have essentially no voids greater than about 5, 4, 3, 2, 1, 0.5, 0.3, 0.2, 0.1, 0.05, or 0.01 microns.

Some embodiments provide thermal-insulation materials or thermal-barrier materials on a metallic or ceramic substrate. Some embodiments provide coatings with good chemical and physical damage resistance as well as structural rigidity. In some embodiments, a coating comprises a multitude of microstructures as described, dispersed in a matrix, wherein the matrix material is selected from the group consisting of ceramics, glasses, metals, and metallic compounds. The coating may be used as thermal insulation or thermal barrier on a metallic or ceramic substrate.

Some embodiments of the invention utilize principles, structures, and methods described in commonly assigned U.S. patent application Ser. No. 14/491,974, filed Sep. 19, 2014, and entitled "THERMAL BARRIER MATERIALS AND COATINGS WITH LOW HEAT CAPACITY AND LOW THERMAL CONDUCTIVITY" (Schaedler et al.), which is hereby incorporated by reference herein.

Variations of the present invention provide structures and compositions of materials that exhibit low thermal conductivity and low volumetric heat capacity. In some embodiments, a cellular material is characterized by a low heat capacity and low thermal conductivity, achieved by (i) structurally possessing high porosity in a closed-celled structure and (ii) containing compositions with low intrinsic thermal conductivity.

In some embodiments, both thermal conductivity and volumetric heat capacity are minimized by adjusting or controlling the cellular architecture on the micron scale. In addition, the cellular architecture and constituent materials are preferably designed or optimized to enhance structural integrity and withstand repetitive stresses from thermal expansion and shrinkage. Structural integrity and robustness may be achieved by a combination of resilient cellular architecture and strong base materials.

In some variations, the invention provides a material comprising metal-containing spheres that are sintered or glued together and/or embedded in a matrix, wherein the material has at least 60% void volume fraction and closed porosity, wherein the material has a thickness from about 50 microns to about 500 microns, and wherein the metal-containing spheres have an average diameter that is from about 5% to about 30% of the material thickness.

In some embodiments, the average diameter is from about 10% to about 25% of the material thickness. This translates to the metal spheres having an average diameter that is 4-10 times smaller than the material thickness.

In some embodiments, the void volume fraction of the material is at least 75%, 80%, or 85%. The material thickness is less than 200 microns, in some embodiments.

In some embodiments, the metal-containing spheres have an average diameter to sphere-wall thickness ratio greater than 10. The metal-containing spheres may contain micropores having an average micropore diameter of less than 10 microns, such as 1 micron or less.

In some embodiments, the metal-containing spheres contain one or more metals selected from the group consisting of nickel, cobalt, cobalt alloys, iron, chromium, tungsten, molybdenum, phosphorus, copper, zirconium, hafnium, titanium, niobium, tantalum, rhenium, alloys thereof, and combinations thereof. In these or other embodiments, the metal-containing spheres contain one or more ceramics selected from the group consisting of zirconium oxide-based ceramics, aluminum oxide-based ceramics, silicon oxide-based ceramics, mullite, silicon nitride-based ceramics, silicon carbide-based ceramics, boron nitride-based ceramics, aluminum nitride-based ceramics, and combinations thereof.

In some embodiments, the material has a thermal conductivity of less than 10 W/m·K at 25° C., and a volumetric heat capacity of less than 1000 kJ/m$^3$·K at 25° C. In certain embodiments, the thermal conductivity is less than 2 W/m·K at 25° C. and/or the volumetric heat capacity is less than 300 kJ/m$^3$·K at 25° C. The material has a crush strength of about 1 MPa or higher, in various embodiments.

Some variations provide a thermal barrier material comprising a material that includes metal-containing spheres sintered or glued together and/or embedded in a matrix, wherein the material has at least 60% void volume fraction and closed porosity, wherein the material has a thickness from about 50 microns to about 500 microns, and wherein the metal-containing spheres have an average diameter that is from about 5% to about 30% of the material thickness. In some embodiments, the thermal barrier material thickness is less than 200 microns, and the average diameter is from about 10% to about 25% of the material thickness.

Certain variations provide a material comprising sintered metal spheres, wherein the material has at least 85% void volume fraction and closed porosity, wherein the material has a thickness from about 50 microns to about 200 microns, and wherein the metal spheres have an average diameter that is from about 10% to about 25% of the material thickness.

In some variations, the invention provides a three-dimensional microstructure comprising one or more metals and/or one or more ceramics, wherein the microstructure is porous with at least 60% void volume fraction and with closed porosity, and wherein the microstructure has a thermal conductivity of less than 10 W/m·K at 25° C., a volumetric heat capacity of less than 1000 kJ/m$^3$·K at 25° C., and a crush strength of about 1 MPa (10$^6$ N/m$^2$) or higher.

By "closed porosity" it is meant that the majority of the porosity present in the microstructure results from closed pores that do not permit fluid flow into or through the pores. By contrast, "open porosity" results from open pores that permit fluid flow into and out of the pores. The total porosity of the microstructure is the sum of open porosity (measurable by intrusion methods, e.g. mercury intrusion) and closed porosity (measurable by microscopic image analysis or calculable from Archimedes measurements, when the bulk density is measured and the theoretical density is known).

The microstructure may be porous with at least 60% void volume fraction, which is the total porosity. In some embodiments, the void volume fraction of the microstructure is at least 65%, 70%, 75%, 80%, 85%, or 90% (total porosity). The porosity may derive from space both within particles (e.g., hollow shapes as described herein) as well as space outside and between particles. The total porosity accounts for both sources of porosity.

In some embodiments, the total porosity is about, or at least about, 50%, 60%, 70%, 80%, 85%, 90%, 95%, 99%, or 100% closed porosity. In certain preferred embodiments, essentially all of the porosity is closed porosity.

In some embodiments, closed porosity is attained with closed cells within the microstructure. For example, the microstructure may include closed-cell foam with an average pore size of less than 0.2 mm, such as an average pore size of about, or less than about, 100 µm, 50 µm, 20 µm, or 10 µm.

In some embodiments, closed porosity is attained with face-sheets disposed on the microstructure. A "face-sheet" refers to any suitable barrier disposed on one or more surfaces of the microstructure to close at least a portion of the pores. The face-sheet may be fabricated from the same material as the rest of the microstructure, or from a different material. The thickness of the face-sheet may vary, such as an average thickness of about 10 µm, 50 µm, 100 µm, 0.5 mm, 1 mm, or more. The face-sheet may be joined to the microstructure using sintering, adhesion, or other chemical or physical bonding, or mechanical means, for example. The face-sheets may be disposed on the top or bottom of the microstructure, or both top and bottom, to attain closed porosity.

The microstructure may include an open-celled microfoam or micro-truss structure with an average cell size less than 0.2 mm, such as an average cell size of about, or less than about, 500 µm, 200 µm, 100 µm, or 50 µm.

In some embodiments, the microstructure comprises a plurality of hollow spheres having an average sphere diameter of less than 0.2 mm, such as an average sphere diameter of about, or less than about, 100 µm, 50 µm, 20 µm, or 10 µm. It is noted that "sphere" means substantially round geometrical objects in three-dimensional space that resemble the shape of a round ball. Not every "sphere" is perfectly round, some spheres may be fragmented, and other shapes may be present within the spheres. For example, imperfect spheres may arise due to pressure applied during sintering, leading to ovoids (egg shapes) or other irregular shapes or random shapes.

By "hollow spheres" it is meant that there is at least some empty space (or space filled with air or another gas such as an inert gas) in the spheres. Typically, the hollow spheres have an average sphere diameter to wall thickness ratio greater than 5, such as about 10, 15, 20, 25, or higher. The average sphere diameter is the total diameter, inclusive of material and space in the sphere. The wall thickness need not be uniform, either within a given sphere or across all spheres.

Generally speaking, the microstructure may include a plurality of hollow shapes selected from the group consisting of spheres, cubes, rods, octets, irregular shapes, random shapes, and combinations thereof. By "hollow shapes" it is meant that there is at least some empty space (or space filled with air or another gas such as an inert gas) in the shapes. The hollow shapes may have an average maximum dimension of less than 0.2 mm and an average ratio of maximum dimension to wall thickness greater than 5. For example, the hollow shapes may have an average maximum dimension of about, or less than about, 100 µm, 50 µm, 20 µm, or 10 µm. Also, the hollow shapes may have an average ratio of maximum dimension to wall thickness of about, or greater than about, 10, 15, 20, or 25. The wall thickness need not be uniform, either within a given shape or across all shapes. Hollow shapes, compared to perfect spheres, may contain more or less open space between shapes, depending on packing configuration.

The pores between hollow shapes may also be characterized by an average diameter, which is an effective diameter to account for varying shapes of those regions. The average diameter of spaces between hollow shapes may be also less than 0.2 mm, such as about, or less than about, 100 µm, 50 µm, 20 µm, 10 µm, or 5 µm. When there is an adhesive or matrix material present, some or all of the space between hollow shapes will be filled and therefore not porous (except for porosity, if any, within the adhesive or matrix material). In some embodiments, the total porosity is about, or at least about, 60%, 70%, 80%, 85%, 90%, 95%, 99%, or 100% closed porosity, not including the space between hollow shapes. In some embodiments, the total porosity is about, or at least about, 50%, 60%, 70%, 80%, 85%, 90%, 95%, 99%, or 100% closed porosity, including the space between hollow shapes. Essentially, the porosity resulting from open space between hollow shapes may be closed, independently from the closed porosity within the hollow shapes.

The hollow spheres (or other shapes) may be bonded together with an adhesive and/or embedded in a matrix material. In certain embodiments, the hollow spheres (or other shapes) are fused together without an adhesive or matrix material. It is possible to combine these techniques so that a portion of hollow shapes are bonded together with an adhesive or matrix material while another portion of hollow shapes are fused together without an adhesive or matrix material.

In some embodiments, the microstructure includes hierarchical porosity comprising macropores having an average macropore diameter of 10 µm or greater and micropores having an average micropore diameter of less than 10 µm. For example, the average macropore diameter may be about, or greater than about, 20 µm, 30 µm, 50 µm, 75 µm, 100 µm, 200 µm, 300 µm, 400 µm, or 500 µm. The average micropore diameter may be about, or less than about, 8 µm, 5 µm, 2 µm, 1 µm, 0.5 µm, 0.2 µm, or 0.1 µm. In certain embodiments, the average macropore diameter is 100 µm or greater and the average micropore diameter is 1 µm or less.

Structural integrity is important for the microstructure for some commercial applications. The structural integrity can be measured by the crush strength, which is the greatest compressive stress that the microstructure can sustain without fracture. The crush strength associated with the microstructure of some embodiments is at least about 0.5, 1, 2, 3, 4, 5, 6, 7, 8, 9, or 10 MPa (1 Pa=1 N/m$^2$) at 25° C. or higher temperatures. Preferably, the crush strength is measured or predicted to be at least 1 MPa under the expected conditions of the intended application. Without being limited by theory, it is believed that good structural integrity can be achieved despite high porosity, due to the presence of micropores which promote good performance even in thin coatings or applications with length scales of less than 1 millimeter, as well as the closed porosity which assists in distribution of mechanical loads.

In some embodiments, the microstructure thermal conductivity is less than 5, 4, 3, 2, or 1 W/m·K measured at 25° C., such as less than 0.9, 0.8, 0.7, 0.6, 0.5, 0.4, 0.3, 0.2, 0.1, 0.09, 0.08, 0.07, 0.06, or 0.05 W/m·K at 25° C. At high porosity, the overall thermal conductivity is reduced because internal pores typically contain still air, which has an extremely low thermal conductivity (approximately 0.02 W/m·K at 25° C.). Internal pores may also contain empty space (vacuum) or an inert gas (e.g., argon or nitrogen).

In some embodiments, the microstructure volumetric heat capacity is less than 500 kJ/m$^3$·K measured at 25° C., such as less than 400, 300, 200, 100, 90, 80, 70, 60, or 50 kJ/m$^3$·K at 25° C. At high porosity, the overall heat capacity is reduced because internal pores typically contain still air, which has an extremely low volumetric heat capacity (approximately 1 kJ/m$^3$·K at 25° C.). Again, internal pores may also contain vacuum or an inert gas, in some embodiments.

The microstructure may include one or more metals selected from the group consisting of nickel, cobalt, cobalt alloys, iron, chromium, tungsten, molybdenum, phosphorus, copper, zirconium, hafnium, titanium, niobium, tantalum, rhenium, alloys thereof, and combinations thereof. Alternatively, or additionally, the microstructure may include one or more ceramics selected from the group consisting of zirconium oxide-based ceramics, aluminum oxide-based ceramics, silicon oxide-based ceramics, mullite, silicon nitride-based ceramics, silicon carbide-based ceramics, boron nitride-based ceramics, aluminum nitride-based ceramics, and combinations thereof.

Some variations of the present invention provide a three-dimensional microstructure comprising one or more metals and/or one or more ceramics, wherein the microstructure is porous with at least 85% void volume fraction and with closed porosity, and wherein the microstructure has a thermal conductivity of less than 2 W/m·K at 25° C., and a volumetric heat capacity of less than 300 kJ/m$^3$·K at 25° C. In some embodiments, the void volume fraction of the microstructure is at least 86%, 87%, 88%, 89%, 90%, or higher. In some embodiments, the three-dimensional microstructure has a thermal conductivity less than 0.5 W/m·K at 25° C. In these or other embodiments, the three-dimensional microstructure has a volumetric heat capacity less than 200 kJ/m$^3$·K at 25° C.

In some embodiments, the microstructure includes a plurality of hollow shapes selected from the group consisting of spheres, cubes, rods, octets, irregular shapes, random shapes, and combinations thereof, wherein the hollow shapes have an average maximum dimension of less than 0.2 mm and an average ratio of maximum dimension to wall thickness greater than 10. In certain embodiments, the hollow shapes comprise, or consist essentially of, hollow spheres. The hollow shapes may be sintered together without an adhesive or matrix material. Alternatively, or additionally, the hollow shapes may be bonded together with an adhesive and/or the hollow shapes may be embedded in a matrix material.

In some embodiments, the invention provides a three-dimensional microstructure comprising one or more metals and/or one or more ceramics, wherein the microstructure is porous with at least 80% void volume fraction which is substantially all closed porosity, and wherein the microstructure has a thermal conductivity of less than 3 W/m·K at 25° C., a volumetric heat capacity of less than 200 kJ/m$^3$·K at 25° C., and a crush strength of about 0.5 MPa or higher.

Some embodiments provide a "thermal protection system" which incorporates any of the disclosed materials, coatings, or microstructures. A thermal protection system may include the substrate or part being thermally protected, or may be configured to be applied to a substrate or part at a later time. A thermal protection system may optionally include control and maintenance methodologies, such as monitoring the coating over time, or monitoring the substrate or part over time or after a specific thermal event.

The invention disclosed herein has various commercial and industrial applications. Applications include, but are not limited to, thermal barrier materials for engine applications, e.g. cylinder liners and exhaust valve liners; and thermal barrier materials for exhaust structures and thermal signature reduction. This invention is applicable for jet engine applications as thermal barrier material on combustors, hot section blades, shrouds and nozzles, and exhaust structures (e.g. flaps and liners). The invention also provides small-pore-size metallic foams for various applications.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A material comprising a plurality of hollow microstructures characterized by an average shortest diameter from about 5 microns to about 1 millimeter,
   wherein each of said microstructures comprises multiple shells, including at least an inner shell and an outmost shell, with a combined thickness that is less than one-tenth of said average shortest diameter;
   wherein said inner shell and said outmost shell have different composition;
   wherein said outmost shell comprises nanoparticles sized between about 10 nanometers to about 500 nanometers; and
   wherein said nanoparticles each contain an oxide and/or said nanoparticles are each surrounded by an oxide layer having a layer thickness of at least 1 nanometer.

2. The material of claim 1, wherein said multiple shells further include at least one intermediate shell disposed between said inner shell and said outmost shell.

3. The material of claim 1, wherein said multiple shells further include at least two intermediate shells disposed between said inner shell and said outmost shell.

4. The material of claim 1, wherein said multiple shells include 10 or less total shells.

5. The material of claim 1, wherein said hollow microstructures are spherical or sphere-like microstructures.

6. The material of claim 1, wherein said hollow microstructures are ovoidal, spheroidal, or ellipsoidal microstructures.

7. The material of claim 1, wherein said hollow microstructures are rod or rod-like microstructures.

8. The material of claim 1, wherein said inner shell comprises a component selected from the group consisting of a polymer, a copolymer, a ceramic, a glass, a metal, carbon, a carbonized organic material, a thermally treated organic material, and combinations thereof.

9. The material of claim 8, wherein said inner shell comprises polyethylene, poly(methyl methacrylate), polystyrene, polyvinylidene chloride, poly(acrylonitrile-co-vinylidene chloride-co-methyl methacrylate), or a combination thereof.

10. The material of claim 1, wherein said inner shell comprises $SiO_2$, $Al_2O_3$, $AlPO_4$, or a combination thereof.

11. The material of claim 1, wherein said outmost shell comprises said nanoparticles dispersed in a matrix.

12. The material of claim 1, wherein said outmost shell contains said nanoparticles, or layers thereof, separated by said oxide or by an organic material.

13. The material of claim 1, wherein said outmost shell contains said nanoparticles in an unfused form.

14. The material of claim 1, wherein said outmost shell contains said nanoparticles fused together to form a solid.

15. The material of claim 1, wherein said nanoparticles are each surrounded by said oxide layer having a layer thickness of at least 1 nanometer, and wherein said nanoparticles further contain an alloy comprising Ni, Co, Fe, Nb, Mo, W, Ta, Cr, or combinations thereof.

16. The material of claim 15, wherein said alloy comprises between about 1 wt % to about 15 wt % Al and further comprises between about 1 wt % to about 25 wt % Cr.

17. The material of claim 1, wherein said nanoparticles are a mixture of Al, Cr, and Ni nanoparticles fused together to a NiCrAl alloy containing between about 5 wt % to about 15 wt % Al, between about 15 wt % to about 30 wt % Cr, and between about 55 wt % to about 80 wt % Ni.

18. The material of claim 1, wherein said nanoparticles are a mixture of Al, Cr, and Ni nanoparticle layers fused together to a NiCrAl alloy containing between about 5 wt % to about 15 wt % Al, between about 15 wt % to about 30 wt % Cr, and between about 55 wt % to about 80 wt % Ni.

19. The material of claim 1, wherein said hollow microstructures contain air or another gas.

20. The material of claim 1, wherein said hollow microstructures are present in an unfused or unbonded precursor state.

21. The material of claim 1, wherein said hollow microstructures are fused together by sintering or heat treatment.

22. The material of claim 1, wherein said hollow microstructures are bonded together with an adhesive or reactive phase.

23. The material of claim 22, wherein said adhesive or reactive phase is about 10 vol % or less of said material.

24. The material of claim 1, wherein said hollow microstructures are dispersed in a matrix material.

25. The material of claim 24, wherein said matrix material is selected from the group consisting of ceramics, glasses, metals, metallic compounds, and combinations thereof.

26. The material of claim 1, wherein said material is a thermal insulation coating or thermal barrier coating disposed on a metallic or ceramic substrate.

27. The material of claim 1, wherein said material is dispersed in a matrix material selected from the group consisting of ceramics, glasses, metals, metallic compounds, and combinations thereof, and wherein said material is a thermal insulation material or thermal barrier material disposed on a metallic or ceramic substrate.

28. A hollow microstructure characterized by a shortest diameter from about 5 microns to about 1 millimeter,
  wherein said microstructure comprises multiple shells, including at least an inner shell and an outmost shell, with a combined thickness that is less than one-tenth of said shortest diameter;
  wherein said inner shell and said outmost shell have different composition;
  wherein said outmost shell comprises nanoparticles sized between about 10 nanometers to about 500 nanometers; and
  wherein said nanoparticles each contain an oxide and/or said nanoparticles are each surrounded by an oxide layer having a layer thickness of at least 1 nanometer.

* * * * *